R. W. PITTMAN.
SAW BLADE.
APPLICATION FILED MAR. 12, 1918.
1,321,391. Patented Nov. 11, 1919.
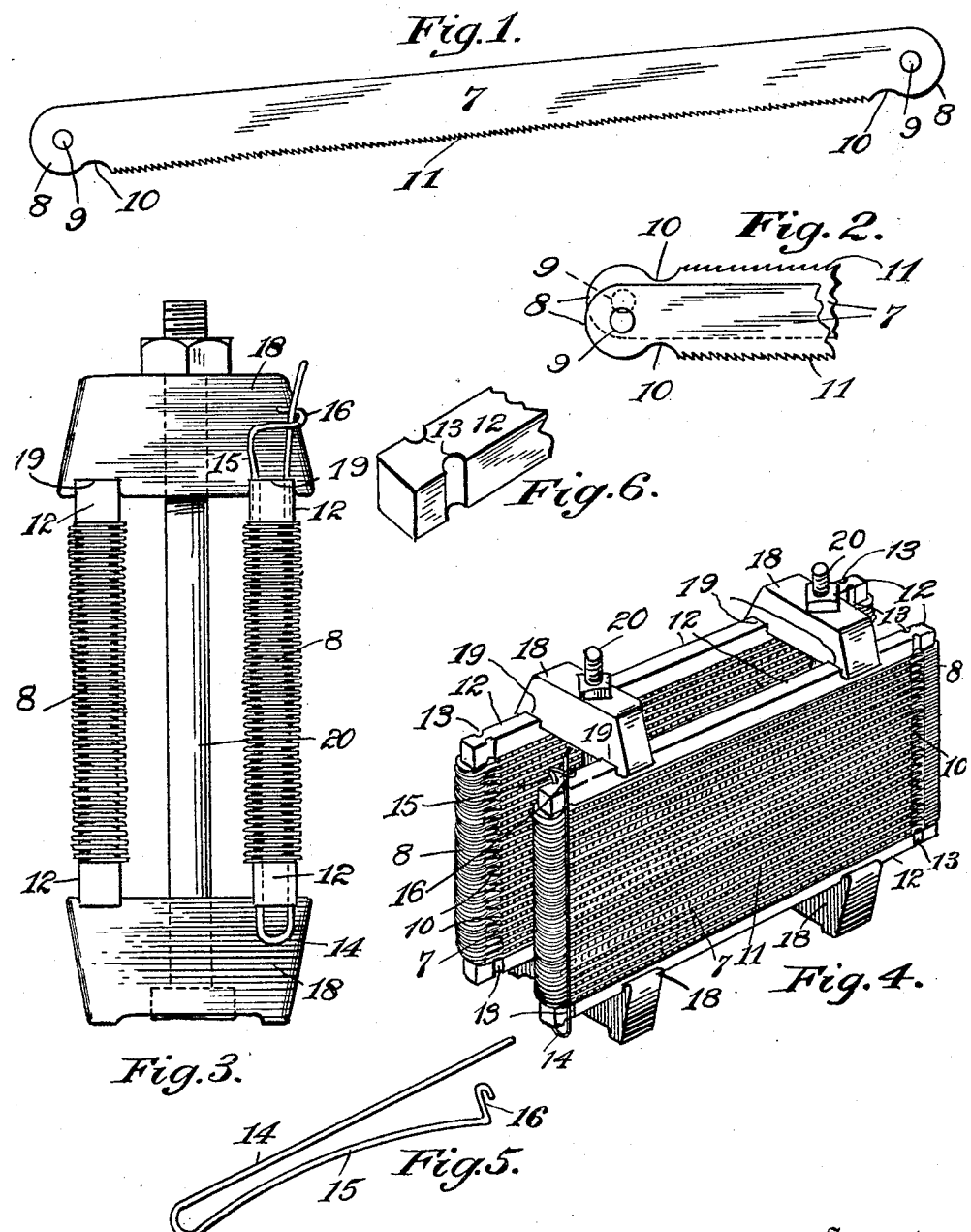

UNITED STATES PATENT OFFICE.

REINHART W. PITTMAN, OF NEW YORK, N. Y., ASSIGNOR, BY MESNE ASSIGNMENTS, TO HENRY C. PITTMAN, OF HACKENSACK, NEW JERSEY.

SAW-BLADE.

1,321,391. Specification of Letters Patent. Patented Nov. 11, 1919.

Original application filed November 30, 1917, Serial No. 204,482. Divided and this application filed March 12, 1918. Serial No. 221,902.

*To all whom it may concern:*

Be it known that I, REINHART W. PITTMAN, a citizen of the United States, and a resident of the borough of Manhattan, in the city, county, and State of New York, have invented certain new and useful Saw-Blades, of which the following is a specification.

This invention relates to saw blades, particularly hack saw blades, and it is the object of the invention to provide an improved saw blade whereby to facilitate the assembling of the blades in piles with the toothed edge of a blade alternating with the back edge of adjacent blades and to project the toothed edge of the blades a predetermined distance beyond the back edge of alternating blades whereby to facilitate the hardening or tempering of the toothed zone only of a plurality of blades simultaneously.

In the ordinary method of hardening saw blades a plurality of saw blades are simultaneously treated in a loose and separated condition or state with the result that all parts of the blade or blades are tempered or hardened thereby making the blade rigid and inflexible and should the blade be bent or buckled during the cutting or sawing of a piece of stock the saw will break. To overcome this disadvantage the toothed zone and the edge portion of a blade only is hardened or tempered and the body portion of the blade left substantially in its normal flexible condition or pliable state. The known methods of only tempering the toothed zone of saw blades are uncertain and unreliable in that, especially in the tempering of saw blades the teeth of which are of very fine pitch, invariably only the face and immediate adjacent portions of the teeth are provided with a face tempering or hardening with the result that when the saw is used this surface tempering chips or quickly wears off and the utility of the same is problematical.

It is the principal object of the invention to overcome the above disadvantages by providing an improved form of blade to permit of the assembling and supporting of a plurality of blades, whereby the surface of the toothed zone of the blades only is exposed and adapted to be subjected to the hardening operation, and the hardening of the entire toothed zone of the respective blades assured.

The present application is a division of my co-pending application filed November 30, 1917, Serial No. 204,482, and in connection with this application I have shown a modified method and means of assembling and supporting a plurality of blades.

In the drawing accompanying and forming a part of this specification, Figure 1 is a perspective view of my improved saw blade.

Fig. 2 is a plan view of a portion of the end of a pair of blades to show the relation of adjacent blades when assembled.

Fig. 3 is an end elevation of two piles of assembled blades and showing the manner of supporting them in assembled position.

Fig. 4 is a perspective view of the means for supporting two piles of assembled blades shown in Fig. 3.

Fig. 5 is a perspective view of a clamping member or bar to retain a pile of blades in assembled position while clamping them in the supporting members shown in Figs. 3 and 4; and Fig. 6 is a perspective view of the end portion of a clamping bar to engage the end blades of the pile.

Similar characters of reference designate like parts throughout the different views of the drawing.

In carrying out the invention the saw blade blank 7 is sheared from a sheet of metal to the desired width and length after which portions of opposite ends of the blank are stamped therefrom to round the ends, as shown at 8, and provided with the usual perforations 9 for the engagement of means to secure the blade in a saw carrying frame. Simultaneously with the rounding of the ends of the blank the blank is provided with gage portions, in the form of recesses 10 stamped from portions of the blank adjacent opposite ends and preferably within the perforated portion of the blank. It will be obvious that these gage portions may be stamped from the blank either previously or subsequent to the rounding of the ends and the perforating of the blanks. The teeth 11 of the blade are formed in a suitable manner and preferably in the edge of the blade in which the gage portions 10 are located and extend between said gage portions, with the latter substantially of a depth equivalent to the depth of the tooth zone or below the base of the teeth, so that the teeth of the blade extend beyond the bottom of the recesses.

It is the object of the gage portions to permit of the assembling of a pile of blades to simultaneously harden or temper the toothed zone of a plurality of blades. With a blade as formed with the gage portions as above set forth the blades are assembled side by side with the toothed edge of blades alternating with the back edge of successive or adjacent blades. After the desired number of blades have been assembled in this relation a block or bar 12 of a width substantially equal to the distance between the back edge and toothed zone or bottom of the teeth of the blades, and of a length substantially the same as the length of the blades, and having opposite recess portions 13 adjacent opposite ends of a form substantially the same as the gage portions 10 in the blades, (Fig. 6) is placed contiguous to the blade at opposite ends of the assembled or pile of blades. The blades are retained in this assembled position with a bar 12 at opposite ends by a clamping member 14 as shown in Fig. 5 embracing the assembled blades at the gage portions. The clamping member 14 comprises a piece of resilient metal, such as wire, bent upon itself with one portion 15 curved as shown to increase the inherent springiness or tension thereof and formed with a hook or loop 16 for engagement of the free end of the portion or the member opposite the portion 15 and which operates to draw the clamping member firmly against the gage portions of the blades and project the toothed edge beyond the back edge of alternate blades to the position substantially as shown in Fig. 2. The pile of blades retained in assembled position by the members 14 is then placed in a clamping apparatus comprising a pair of clamping members to support the pile of blades adjacent opposite ends and is shown arranged to carry two piles of blades or assembled saw blades. The clamping members consist of a pair of jaws 18 having recesses 19 therein for the engagement of the bars 12 at opposite sides of the assembled blades to prevent lateral displacement of the assembled blades, and the jaws are drawn or locked together by bolts or tie rods 20 passing through openings centrally of the jaws. When the assembled blades are secured between the clamping jaws 18 the clamping members 14 are removed when the assembled blades are in condition to be subjected to the hardening or tempering operation.

The blades when assembled and clamped between the clamping jaws 18 as shown in Figs. 3 and 4 are in condition to be subjected to the hardening treatment, and in this condition are placed in a heating furnace to be heated to the desired degree. After the assembled blades have been heated to the necessary degree the carrier with the blades is removed from the furnace and the blades suddenly chilled by plunging in a cooling bath. It will be noted that the entire toothed zone and the back edge of the blades are the only portions of the blades which are subjected to contact with the cooling liquid by supporting the blades in the manner above set forth with the result that the toothed zone of the blades only will be tempered with a scale hardening on the back edge of the blades, and that the body portion of the blades not being exposed will not be subjected to contact with the cooling liquid and will therefore remain substantially in their original flexible condition, and may be flexed after the hardening of the toothed zone without liability of breakage of the blades. Furthermore, by the hardening of the edge portion of the blades as well as the toothed zone the distorting and warping of the blade due to changes in the molecular structure of the metal as the blade is subjected to the hardening process is obviated.

As is well known in the hardening of metal the sudden cooling of the heated metal tends to harden the metal to an excessive degree, and by assembling the blades in the manner as above set forth and subjecting the blades in such assembled condition to a tempering bath the temper of the hardened toothed zone and the edge portion of the blades only may be drawn to the desired temper without affecting any other portion of the blade.

Having thus described my invention, I claim:

1. As a new article of manufacture a saw blade comprising a blank having teeth formed along the edge, and gage portions in the edge of the blank adjacent opposite ends for the purpose specified.

2. As a new article of manufacture a saw blade comprising a blank having teeth formed along the edge of the blank with a recess in the edge of the blank adjacent opposite ends of a depth equivalent to the depth of the toothed zone of the blade for the purpose specified.

3. As a new article of manufacture a saw blade comprising a blank having teeth formed along one edge of the blade with a recess in the edge of the blade with the teeth adjacent opposite ends of the blade with the teeth extending beyond the bottom of the recesses for the purpose specified.

4. As a new article of manufacture a saw blade comprising a blank having teeth formed along one edge, and gage portions at opposite ends of the toothed portion with the toothed zone of the blade extending beyond the gage portions for the purpose specified.

5. As a new article of manufacture a saw blade having teeth formed along one edge with the toothed zone of the blade hardened and having gage portions at opposite ends of the toothed portion with the toothed zone of the blade extending beyond the gage portions for the purpose specified.

6. As a new article of manufacture a saw blade having teeth formed along one edge with a blank portion at opposite ends of the teeth having recesses therein to extend below the base of the teeth and with the toothed zone and edge only of the blade hardened.

7. As a new article of manufacture a saw blade having teeth formed along the edge and the toothed zone and edge of the blade hardened and the body portion of the blade maintained in an unhardened state, and said blade having gage portions at opposite ends for the purpose specified.

Signed at New York city, in the county of New York, and State of New York this 8th day of March, 1918.

REINHART W. PITTMAN.

Copies of this patent may be obtained for five cents each, by addressing the "Commissioner of Patents, Washington, D. C."